(12) United States Patent
Ahn et al.

(10) Patent No.: US 6,272,124 B1
(45) Date of Patent: Aug. 7, 2001

(54) COMPLEMENTAL SERVICE PROVIDING DEVICE AND METHOD IN COMMUNICATION SYSTEM

(75) Inventors: Jae-Min Ahn; Soon-Young Yoon; Hee-Won Kang; Young-Ky Kim, all of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/094,374

(22) Filed: Jun. 9, 1998

(30) Foreign Application Priority Data

Jul. 25, 1997 (KR) ............................................. 97-34921
Dec. 6, 1997 (KR) ............................................. 97-66556
May 18, 1998 (KR) ............................................. 98-17818

(51) Int. Cl.[7] ............................. H04B 1/69; H04B 7/216
(52) U.S. Cl. ........................ 370/342; 370/522; 455/466; 455/522
(58) Field of Search ...................... 370/335, 342, 370/479, 522, 528; 455/466, 522

(56) References Cited

U.S. PATENT DOCUMENTS

| 5,896,411 | * | 4/1999 | Ali et al. | 375/200 |
| 5,946,356 | * | 8/1999 | Felix et al. | 375/295 |
| 5,987,326 | * | 11/1999 | Tiedemann, Jr. et al. | 455/442 |
| 6,137,789 | * | 10/2000 | Honkasalo | 370/342 |
| 6,148,208 | * | 11/2000 | Love | 455/442 |

\* cited by examiner

*Primary Examiner*—Melvin Marcelo
(74) *Attorney, Agent, or Firm*—Dilworth & Barrese, LLP

(57) ABSTRACT

A data service providing method for use a communications system which has a forward traffic channel including a fundamental channel and a supplemental channel. The total transmission power of a base station is detected, and when it is complemental a reference transmission power data is transmitted on a forward link via a predetermined complemental channel. The complemental data is received from the forward link, and processed in a terminal.

30 Claims, 12 Drawing Sheets

COMPLEMENTAL SERVICE PROVIDING DEVICE AND METHOD IN COMMUNICATION SYSTEM

BACKGROUND OF THE INVENTION

1. Field of the Invention

The present invention relates to a data service providing method in a communications system, and in particular, to a method for providing data services at high speed via complemental channels.

2. Description of the Related Art

The highest bit rate per user in a CDMA (Code Division Multiple Access) system is 9.6 kbps/14.4 kbps. Many methods have been suggested to exceed this data rate limit and provide data services at high speed. One of them, a multi-code scheme, assigns a plurality of (eight in maximum) code channels to one user and offers him data services at a maximum bit rate of 14.4 kbps×8.

Despite its ability of implementing various supplemental functions for the user, the method of providing high-speed data service has a drawback in that as the user can transmit and receive a larger amount of data through the high-speed data service, a CDMA mobile communications network becomes accessible to less users. This implies that an increase or decrease in the number of users may bring a rapid change to the bit rate (number of users ×bit rate per user) of the entire communications network. In this case, the stability of the CDMA mobile communications network may be impaired.

Accordingly, this problem should be minimized and reliable provisions of existing basic services should be ensured, for high-speed data services.

FIG. 1 is a block diagram of a terminal, a base station, and a radio link in a mobile communications system. The radio link of FIG. 1 is composed of a forward channel transmitted from the base station to the terminal and a reverse channel transmitted from the terminal to the base station.

A conventional CDMA mobile communications system following the IS-95/IS-95A/J-STD-008 standard has a forward channel structure as shown in FIG. 2A and a reverse channel structure as shown in FIG. 2B. The forward CDMA channel has a pilot channel, a sync channel, a paging channel, and a forward traffic channel, as shown in FIG. 2A. The reverse CDMA channel includes an access channel and a reverse traffic channel, as shown in FIG. 2B.

The forward code channels contain 64 orthogonal Walsh codes, with one forward traffic channel occupying one Walsh code. Thus, the full transmission bit rate of each forward or reverse traffic channel is 9.6 kbps/14.4 kbps. To provide data service at high speeds exceeding 14.4 kbps in the above CDMA channel structures, at least one forward Walsh code and one reverse Walsh code should be allowed to a user.

For this purpose, the forward and reverse CDMA traffic channels of FIGS. 2A and 2B should be further divided as shown in FIGS. 3A and 3B, respectively. In a new CDMA channel structure, the forward channel includes a pilot channel, a sync channel, a paging channel, and a forward traffic channel divided into a fundamental channel and a supplemental channel, while the reverse channel includes an access channel and a reverse traffic channel divided into a fundamental channel and a supplemental channel.

The high-speed data service in the above channel structures refers to a multi-code scheme. The fundamental channels of FIGS. 3A and 3B support the same functions and bit rates as those of the conventional forward and reverse traffic channels. The supplemental channels are assigned to a user upon his request for high-speed data service, and are not used in the absence of a user request. 0 to 7 supplemental channels are available to the user depending on their request.

When a user is to receive high-speed data service via the supplemental channels, connection information should be first obtained from a corresponding base station via the pilot channel, sync channel, and paging channel. Then, a user terminal attempts to connect with the base station via the access channel, using the obtained information. With a successful connection via the access channel, a connection path is formed between the user terminal and the base station. Since then, the connection between them is maintained via the fundamental channels.

Generally, data services that the user desires have a burst-type quality depending on the amount of data transmitted. That is, data to be transmitted or received instantaneously does not always exist, and a data transmission period is coexistent with a data non-transmission period. In this context, only when a call is set up between the terminal and the base station via the fundamental channels, and it is necessary to transmit data at high speed from a user or the base station, the request for high-speed data transmission is notified to the other party, and a high-speed data service is provided via the supplemental channels. Via the fundamental channels, the negotiation is performed, and completion of the data transmission is notified. Then, the supplemental channels stop their action.

The above procedure is exemplarily illustrated in FIG. 4, on the part of the terminal.

In step 411, a call is set up between the terminal and the base station via the fundamental channels. In step 413, the terminal determines whether high-speed data transmission data exists. If so, the terminal sends a request for use of a supplemental channel to the base station via a reverse fundamental channel (i.e., the base station commands the terminal to use a supplemental channel via a forward fundamental channel), in step 415. In step 417, the base station determines whether the requested supplemental channel can be designated (the terminal determines whether the commanded supplemental channel can be received). If the designation is impossible, the base station notifies the terminal of the unavailability of the supplemental channel via the forward fundamental channel (if the reception is impossible, the terminal notifies the base station of the reception impossible via the reverse fundamental channel), and the call is maintained via the forward and reverse fundamental channels, in step 419. Then, the procedure goes back to step 413.

On the contrary, if the supplemental channel is available in step 417, the base station gets the supplemental channel ready, and notifies the terminal of the readiness of the supplemental channel via the forward fundamental channel (and the terminal notifies the base station that the terminal is ready via the reverse fundamental channel), in step 421. In step 423, data is transmitted between the terminal and base station at high speed via the fundamental and supplemental channels. In step 425, it is determined whether the high-speed data transmission/reception is completed. If it is not completed, steps 423 and 425 are repeated.

If the high-speed data transmission/reception is completed in step 425, the base station and the terminal notify the other parties of completion of the transmission/reception via the forward and reverse fundamental channels, the supplemental channels stop their action, and the call is maintained via the fundamental channels, in step 427. In step 429, it is determined whether the call is completed, while maintaining the call. If the call is not completed, the procedure goes back to step 413. Otherwise, a call completion process is performed, in step 431.

As shown in FIG. 4, the multi-code using high-speed data service exhibits temporal code channel occupation characteristics due to data transmission and reception in the form of packets. That is, code channels are concentratedly busy for a predetermined time, but they are idle for other time periods.

FIG. 5 illustrates use of forward code channels when high-speed data service is provided to two users via supplemental channels. The horizontal axis indicates time, and the vertical axis indicates the number of code channels used, which eventually represents the forward CDMA channel load. That is, the load increases with the number of the code channels being used.

In FIG. 5, F represents a fundamental channel, and a number attached to F represents a user number. Thus, F1 indicates a fundamental channel for user 1. S indicates a supplemental channel, and first and second numbers attached to S indicate a user number and the number of a supplemental channel used, respectively. Thus, S2,3 indicates supplemental channel 3 for user 2.

However, the conventional high-speed data service using a multicode as shown in FIG. 4 raises the problem that the total forward bit rate is not constant and rapidly changes when high-speed data service is provided on the forward supplemental channel.

The changing of the total bit rate prevents full use of an available CDMA channel capacity, thereby wasting channel capacity. Assume that every data is transmitted at a constant rate from the base station, table 1 is listed from a received packet M/M1/queuing model.

TABLE 1

| waiting time of packet | wasted capacity |
| --- | --- |
| twice transmission time | 33% |
| ten times transmission time | 9% |

Table 1 is obtained by $$W = \left(\frac{\rho}{1-\rho}\right)\left(\frac{1}{\mu}\right)$$

$$\rho_0 = 1-\rho \quad (1)$$

where W is a waiting time, $1/\mu$ is an average transmission time, $\rho$ is $\lambda/\mu$, $\lambda$ is an input rate, $\rho$ is a use rate, and $\rho_0$ is a non-use rate. In the above case, supplemental channels are used as shown in FIG. 5. Idle time slots are generated when data service is provided within a predetermined capacity as shown in FIG. 5, resulting in a waste of capacity.

Another problem, namely, the rapid change of bit rate indicates a rapid change in the forward load, which is likely to impede stable cell operations. Assume that the ratio of pilot power to voice user power to data user power is 2:0.4:8 where 0.4 is a voice activity and 8 indicates use of eight channels used at a full rate. Also assuming that there are 10 users in each of, for example, two cells, data users are confined to one cell, and a base station uses a given total power, the radius of the data user cell is reduced by 10% in effect. If the base station outputs a constant pilot power, Ec/Io (a key parameter of handoff) reported from the terminal can vary by 2 dB depending on the presence or absence of a data user.

The above-described two problems impede stable communications network operations and cause channel capacity consumption.

SUMMARY OF THE INVENTION

Therefore, an object of the present invention is to provide a device and method for providing a complemental data service for a time period when data is not loaded on a forward traffic channel during communication, in a communications system, in order to keep a data rate constant.

Another object of the present invention is to provide a device and method for providing a complemental data service via a complemental channel designated on a forward link by a base station, if the total transmission power of the base station is lower than a reference transmission power level during communication between the base station and a terminal.

Still another object of the present invention is to provide a device and method for providing a complemental data service via a corresponding channel for a time period when data is not loaded on the channel during communication between a base station and a terminal, in a communications system.

To achieve the above objects, there is provided a data service providing method. In the data service providing method for use a communications system which has a forward traffic channel including a fundamental channel and a supplemental channel, the total transmission power of a base station is detected. If the total transmission power is lower than a reference transmission power level, and the complemental data is received from the forward link, and processed in a terminal, complemental data is transmitted on a forward link via a predetermined complemental channel.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
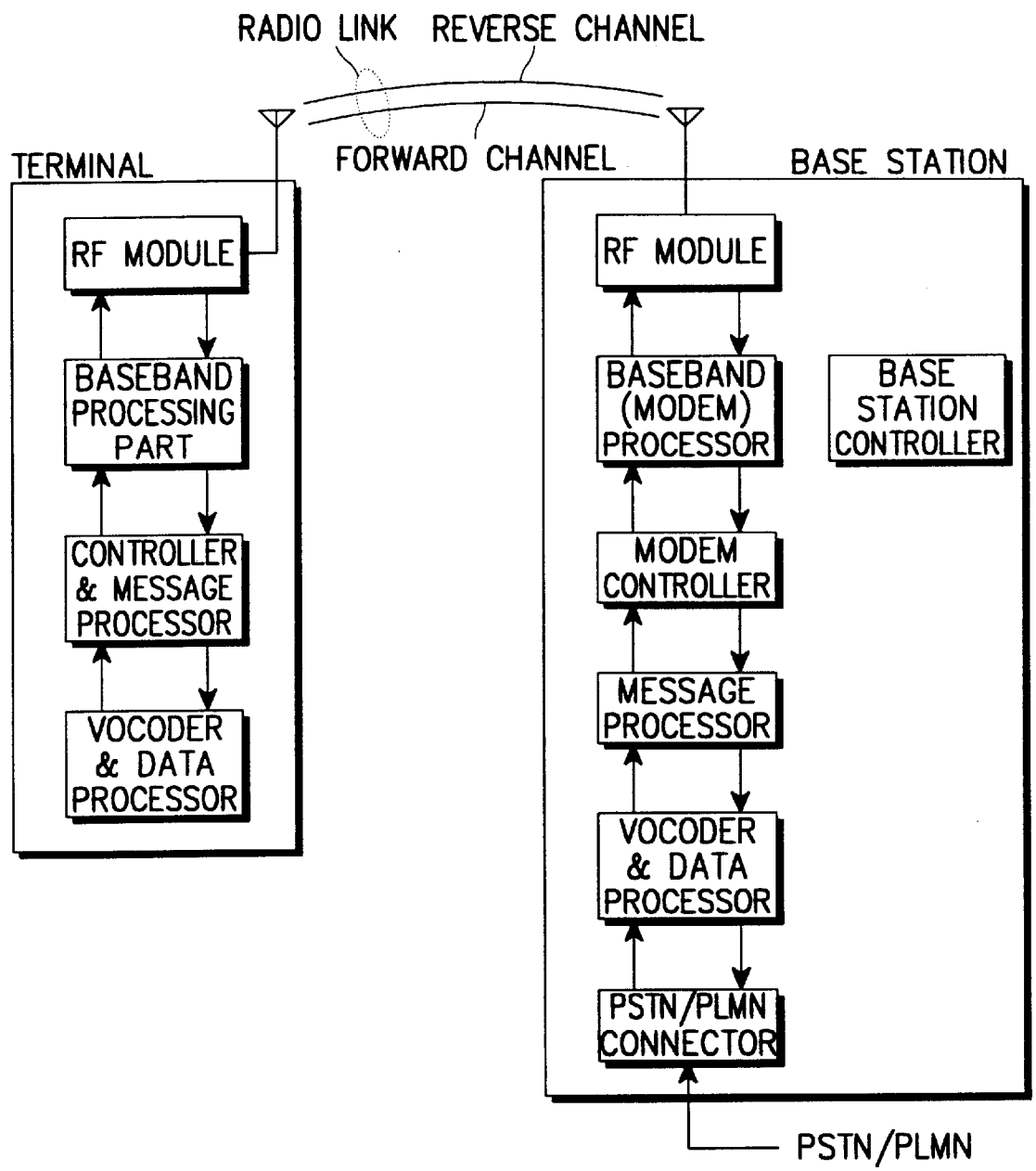
FIG. 1 is a block diagram of a terminal, a base station, and a radio link in a conventional communications system.
Figure 2A:
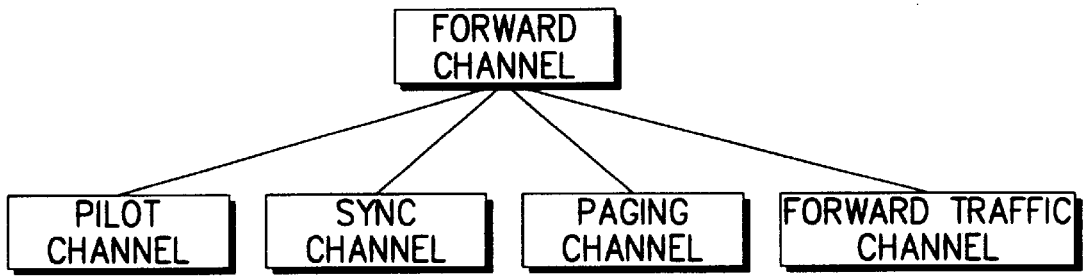
FIGS. 2A and 2B illustrate forward and reverse channel structures based on the CDMA standard, respectively.
Figure 2B:
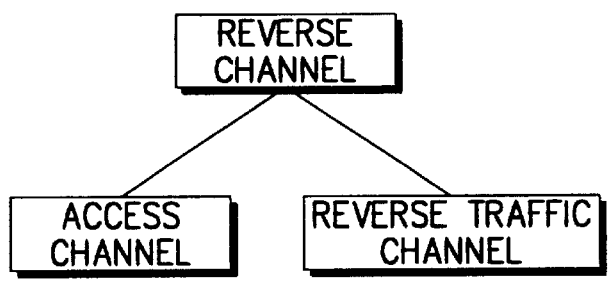
Figure 3A:
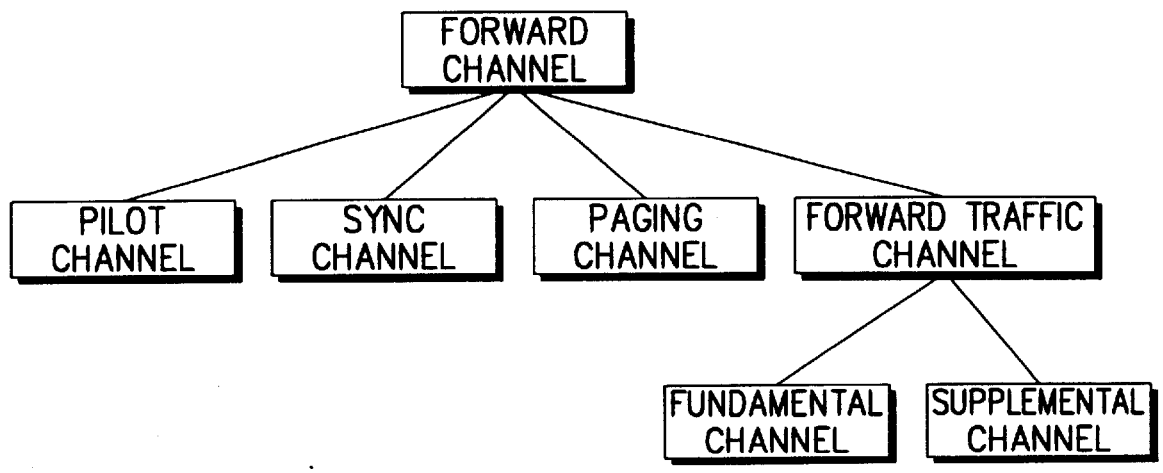
FIGS. 3A and 3B illustrate forward and reverse channel structures based on a new CDMA standard for high-speed data transmission, respectively.
Figure 3B:
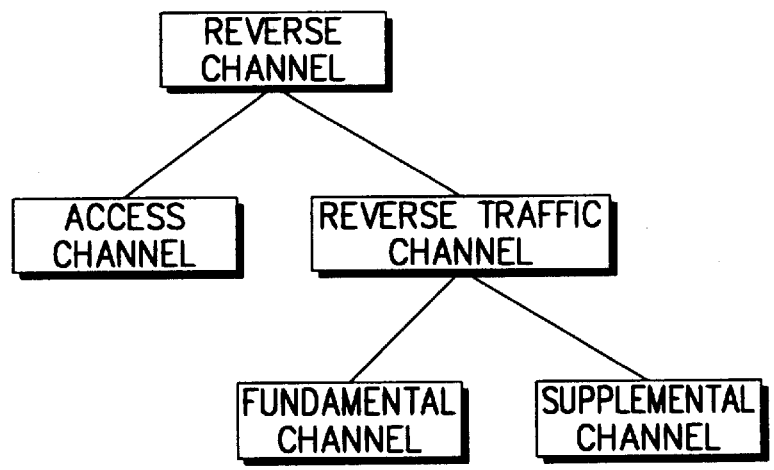
Figure 4:
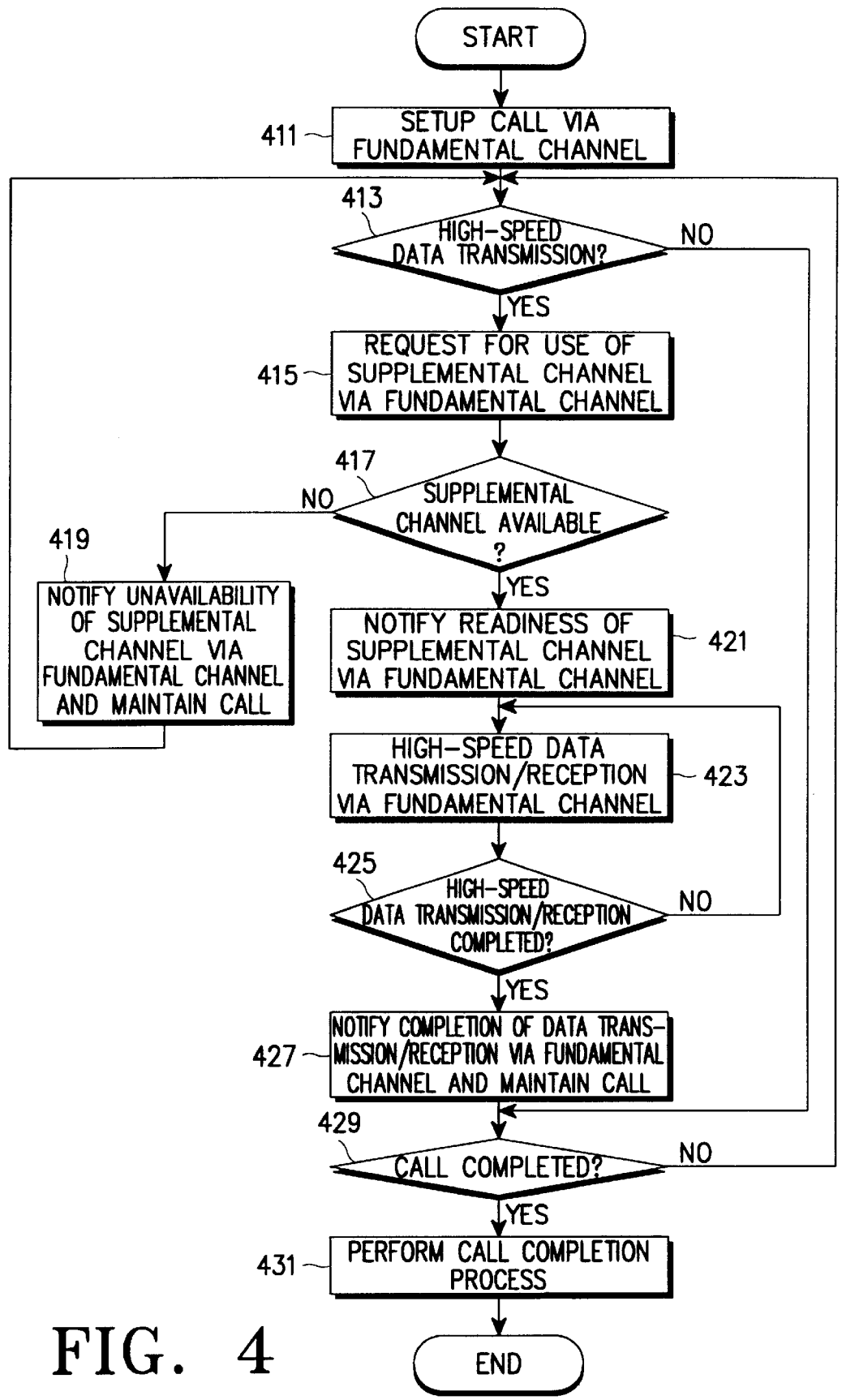
FIG. 4 is a flowchart for providing data service via supplemental channels in a CDMA system having the channel structures shown in FIGS. 3A and 3B.
Figure 5:
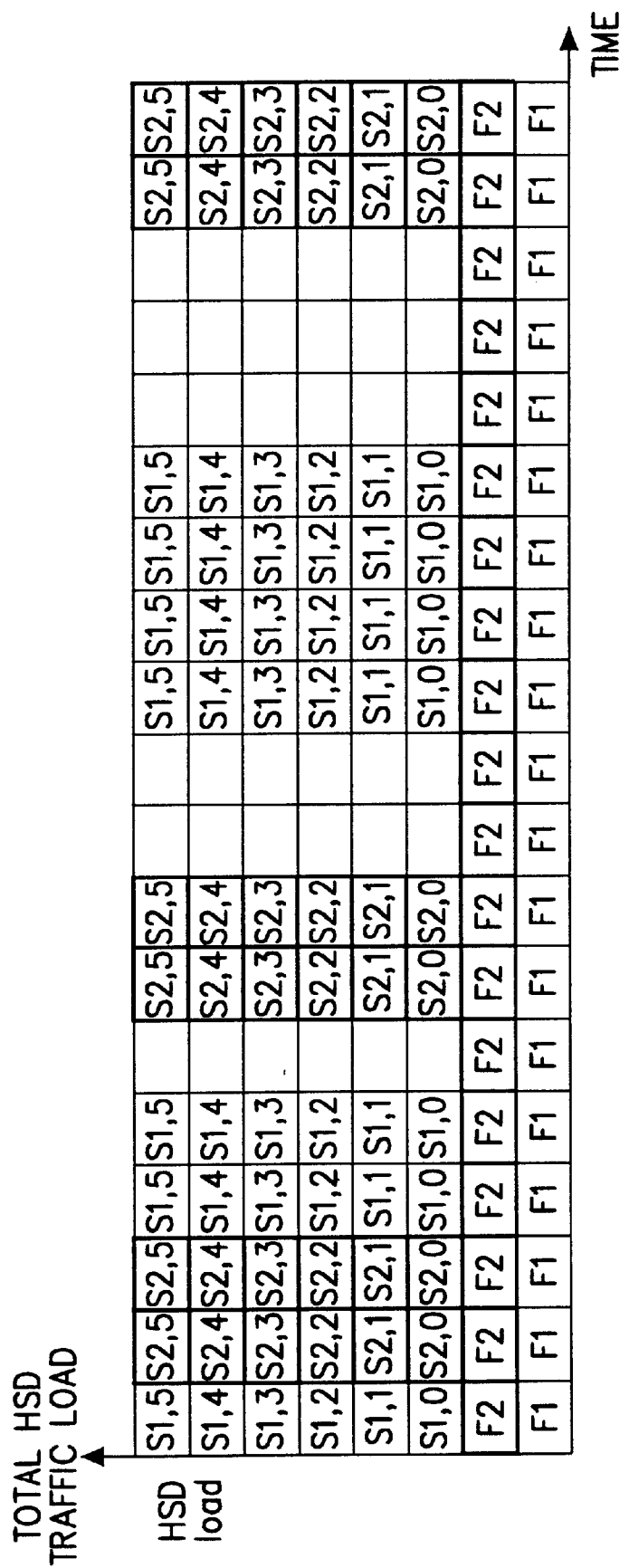
FIG. 5 illustrates an exemplary use of supplemental channels for high-speed data service.

There is a need for a method for maintaining the total output signal strength of a base station to be constant in order to prevent the rapid change of cell radius and pilot power caused by user load for high-speed data service on a base station. In this method, the strength of the whole output signal of the base station is maintained within a predetermined range by outputting predetermined data when the strength of the output signal is small.

As for terminology, in an embodiment of the present invention for maintaining a constant output signal strength in the above method, complemental data is the data output when the output signal strength from the base station is small. Complemental service refers to the provision of the complemental data, and a complemental channel is a channel on which the complemental data is transmitted.

An objective of the complemental service is to prevent rapid changes in pilot power, while keeping the radius of the base station within a predetermined range. Another objective lies in offering a wider choice of services and high satisfaction to users of mobile communications by instantaneously filling the idle capacity of a base station with useful data and providing the data to the users.

A low priority should be given to the complemental service, relative to call attempt via fundamental and supplemental channels, because the complemental service should be resumed and stopped at any time depending on variations of the output signal strength of the base station. Thus, the complemental service contributes to stable operation of a base station.

Such complemental data serviceable with a low priority includes weather forecast, traffic, stock information, time, advertisement, and other information. Also, services taking a long time such as transmission of a large file may be delivered at a lower price in complemental service. However, in this case, such service is directed to specific users, thus requiring a specific protocol implemented with a low priority. This protocol is a matter of little interest to the present invention, and its detailed description is avoided here.

To provide such complemental services, there is a need for a terminal capable of accommodating the complemental services, and priority should be set among complemental services to be processed in the terminal. Complemental services are provided to the complemental service accommodating terminal as follows.

A terminal which wants complemental service notifies a base station that it is to receive the complemental service during a call set-up between the terminal and the base station. The terminal is assigned an orthogonal code number indicative of a complemental channel for the complemental service from the base station. There are two ways to assign the orthogonal code number from the base station to the terminal. One is a multicast or broadcast method referring to designating some of the total orthogonal codes as complemental channels. In this method, a complemental channel is used as a kind of an overhead channel, indicating that a complemental channel is fixed. In this case, the complemental service includes commonly available data like traffic, weather, and stock information. The other is a point-to-point method referring to provision of complemental data from a base station to a corresponding terminal via a designated channel. Using the designated channel, the base station transmits complemental data to the terminal during a data non-transmission period during a communication, and the terminal processes data transmitted on a forward link via the designated channel.

Here, a Walsh code may be used as the orthogonal code, and the orthogonal code is assumed to be the Walsh code, hereinafter. The terminal capable of receiving complemental service and assigned the Walsh code of a complemental channel during the call set-up checks the complemental channel periodically in the absence of a call or data transmission/reception via a fundamental or supplemental channel, to determine whether complemental data is provided. The terminal uses the complemental data when it is provided via the corresponding complemental channel at the checking time point.

A complemental channel designation algorithm is shown in FIG. 9. In step 911, a terminal and a base station set up a call via fundamental channels. In step 913, the terminal determines whether there exists high-speed transmission data. In the case of the high-speed data transmission, the terminal sends a request for use of a supplemental channel to the base station via a reverse fundamental channel (the base station commands the terminal to use a supplemental channel via a forward fundamental channel), in step 915. In step 917, the base station determines whether the requested supplemental channel can be designated (the terminal determines whether the commanded supplemental channel can be received). If the designation is impossible, the base station notifies the terminal of unavailability of the supplemental channel via the forward fundamental channel (if the reception by the terminal is impossible, the terminal notifies the base station of the reception impossible via the reverse fundamental channel), and the call is maintained via the forward and reverse fundamental channels, in step 919. Then, the procedure goes back to step 913.

On the contrary, if the supplemental channel is available in step 917, the base station gets the corresponding supplemental channel ready, and notifies the terminal of the readiness of the supplemental channel via the forward fundamental channel, (and the terminal notifies the base station that the terminal is ready for the supplemental channel via the reverse fundamental channel), in step 921. In step 923, data is transmitted between the base station and the terminal at high speed via the designated supplemental channel. If the total transmission power P of the base station is equal to or higher than a predetermined reference transmission power $P_{high}$ at step 925, the procedure jumps to step 935. If P is smaller than $P_{high}$, the number of complemental channels is determined in step 927, and complemental service is performed in step 929. If P is smaller than $P_{high}$ in step 931, the procedure goes back to step 927. If P is equal to or higher than $P_{high}$, it is determined whether high-speed data transmission and reception is completed, in step 935. If it is not completed, steps 923–935 are repeated.

On the other hand, if the data is completely transmitted/received in step 935, the completion of the transmission/reception is notified to both the terminal and the base station via the forward and reverse fundamental channels, the supplemental channel stops its action, and the call is maintained via the fundamental channels, in step 937. It is determined whether the call is terminated, while the call is maintained, in step 939. If the call is not terminated, the procedure goes back to step 913. Otherwise, a call completion process is performed, in step 941.

Among complemental services, transmission of a large file requires a specific protocol, while other general services require no specific protocols. In the absence of complemental data at the time point when the complemental channel is checked, the complemental channel is rechecked upon no data transmission/reception via fundamental or supplemental channels a predetermined time later.

Because the complemental service is provided only if the base station turns out to have an extra capacity from a self-check, it is basically related with a forward link for transmitting a signal from the base station to a terminal. To provide the complemental service from the base station, a method is needed, in which the base station checks its channel capacity to determine whether to provide the complemental service. For this purpose, a base station control processor determines the power level of a signal transmitted from the base station, using $$P=G(1)\times G(1)+G(2)+\ldots +G(N)\times G(N) \qquad (2)$$

In equation (2), P is the total power of signals transmitted from the base station, and G(i) where i=1, 2, ..., N is the gain of an i-th channel. That is, the power of each channel in the base station can be expressed as the square of the transmission gain of the channel, and the total transmission power of the base station is the sum of the transmission powers of all individual channels. Through this procedure, the base station control processor can determine the total transmission power level of the base station at a corresponding moment. The base station control processor can determine whether to provide the complemental service at the corresponding moment, on the basis of the total transmission power. If the complemental service is being provided, the base station control processor should determine whether to continue the current complemental service, based on $$P<P_{low} \qquad (3)$$

$$P>P_{high} \qquad (4)$$

In equation (3), $P_{low}$ is a transmission power reference for use in determining whether to provide the complemental service from the base station, and will be referred to as the lowest reference transmission power limit. That is, at the time point when P is lower than $P_{low}$, the base station starts to provide the complemental service via a complemental channel. $P_{high}$ in equation (4) is a transmission power reference for use in reducing a current complemental service, and will be referred to as the highest reference transmission power limit. That is, at the moment when P is higher than $P_{high}$, the base station controls the currently used complemental channel to reduce or stop the complemental service.

According to equations (3) and (4), the base station control processor compares P with $P_{low}$ and $P_{high}$. With P smaller than $P_{low}$ as shown in equation (3), the base station control processor operates to maintain P of equation (2) to be $P_{low}$ or higher by providing complemental service via a complemental channel. If P satisfies equation (3) and the complemental service is being provided, the base station control processor maintains P to be $P_{low}$ or higher by increasing the amount of complemental data, that is, assigning more complemental channels.

P is higher than $P_{high}$ in equation (4), which implies that there is no extra power for the complemental service, and P should be $P_{high}$ or lower by reducing the amount of the complemental data if the complemental service is being provided.

Equations (2), (3), and (4) show the relationship between the total transmission power of a base station and the reference power levels referred to by the base station control processor in providing complemental service. The structure and operation of an embodiment of the present invention will be described referring to FIGS. 6 and 7, in actual application of these equations.

Figure 6:
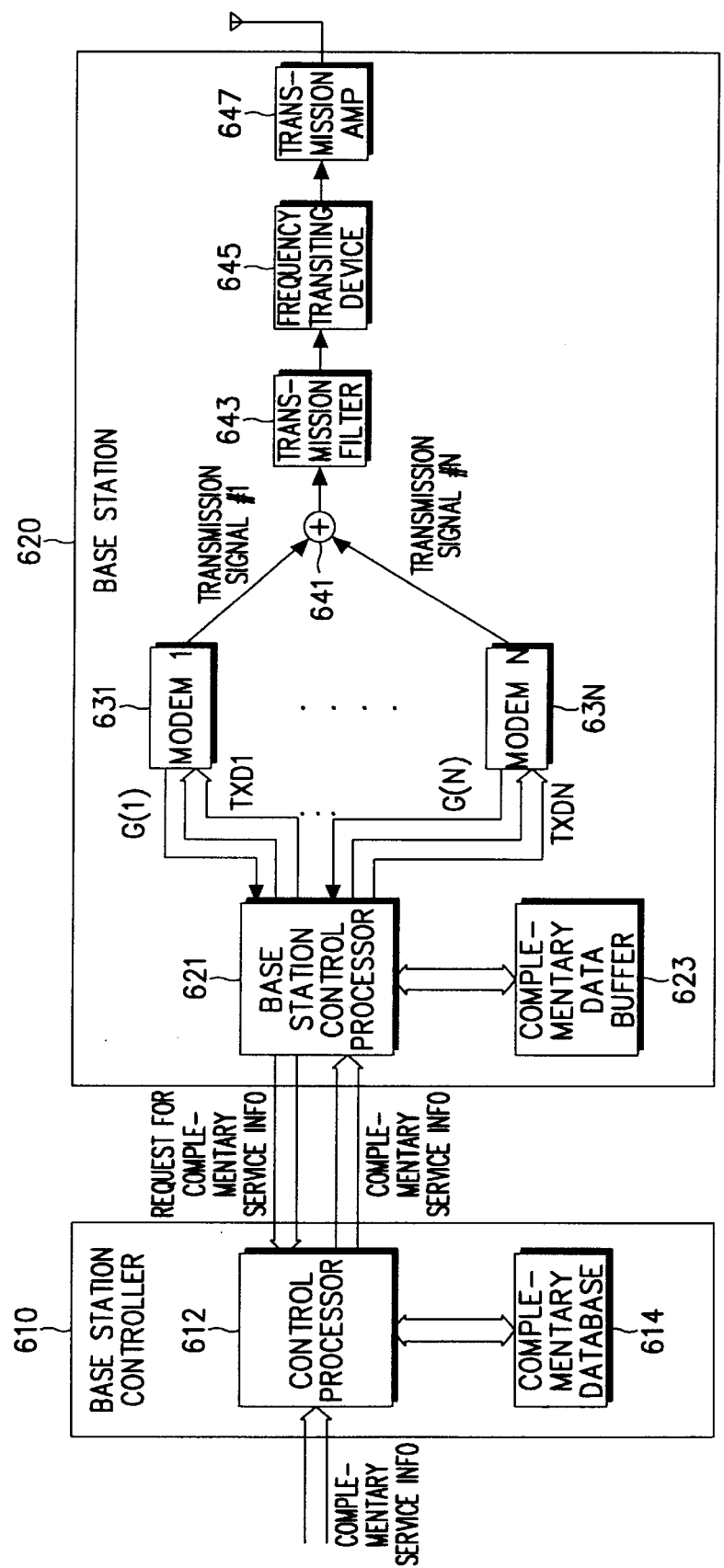
FIG. 6 is a block diagram of a base station for providing complemental service, along with complemental service-related blocks, and related-data and signal streams, according to an embodiment of the present invention.

FIG. 6 is a block diagram of a base station for providing complemental service, having data, and data stream blocks related with the complemental service.

Referring to FIG. 6, a control processor 612 of a base station controller 610 repeatedly collects complemental data from a higher network, and stores the collected data in a complementary data base 614. The data stored in the complemental data base 614 is read by the control processor 612 upon request of a base station control processor 621 for the data in a base station 620, and transmitted to the base station control processor 621.

Then, the base station control processor 621 stores the received complemental data in a complemental data buffer 623 under its management, to be transmitted during a complemental service.

When determining to start the complemental service in the method described referring to equations (2), (3), and (4), the base station control processor 621 reads the complemental data from the complemental data buffer 623, and transmits the data to a corresponding modem among modems 631–63N for transmitting complemental channels. Then, the base station control processor 621 requests for transmission of additional complemental data from the control processor 612. When the control processor 612 transmits the requested complemental data, the base station control processor 621 refills the empty complemental data buffer 623 with the data.

Here, the respective modems 631–63N periodically report the gain G(i) (i=1, 2, ..., N) of a current transmission signal, to allow the base station control processor 621 to check the total transmission power and make complemental service-related decisions. Transmission signals of the modems 631–63N are added in an adder 641, and transmitted as a forward link signal to a terminal via a transmission filter 643, a frequency transiting device 645, a transmission amplifier 647, and an antenna.

Figure 7:
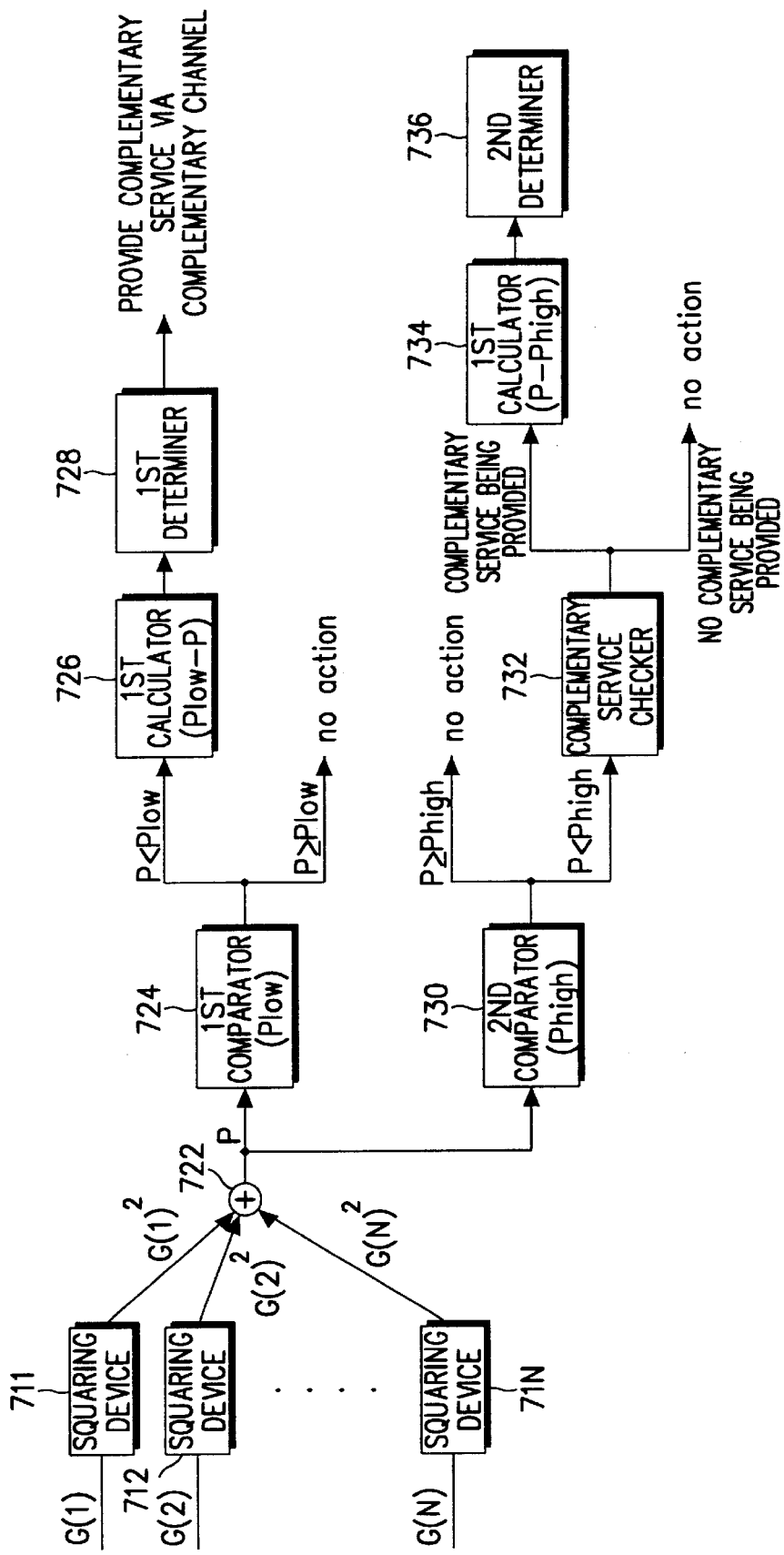
FIG. 7 is a block diagram of a base station control processor in a base station, along with an algorithm for determining the start and end of complemental service in the base station control processor, according to an embodiment of the present invention.

FIG. 7 is a block diagram of the base station control processor 621, in relation with an algorithm for determining the start and end of the complemental service.

Referring to FIG. 7, squaring devices 711–71N convert corresponding signals G(i) (i=1, 2, ..., N) received by the base station control processor 621 from the respective modems 631–63N to transmission powers currently being transmitted by the modems 631–63N. The respective transmission powers output from the squaring devices 711–71N add up to the total transmission power of the base station 620 in an adder 722. The thus-calculated total transmission power P is compared with the complemental service-related reference power levels $P_{low}$ and $P_{high}$.

A first comparator 724 compares P with $P_{low}$. If P is smaller than $P_{low}$ (P<$P_{low}$), this implies that the current total transmission power is smaller than the reference power, and there is extra channel capacity for providing complemental service. Therefore, the base station control processor 621 can transmit complemental data within a channel capacity. In this case, a first calculator 726 calculates the maximum amount of transmittable complemental data by the difference between P and $P_{low}$ obtained in the first comparator 724. A first determiner 728 determines the number of channels for providing complemental service from the calculation result, and then provides a corresponding complemental service via a complemental channel.

For determination of the number of complemental channels, the first determiner 728 relies on $$n = \left[\frac{P_{low} - P}{P_{unit}}\right] \quad (5)$$

where n indicates the number of available complemental channels, and $P_{unit}$ indicates transmission power per channel. Therefore, the first calculator 726 obtains the complemental service enabling power value by ($P_{low}$–P), and then the first determiner 728 determines the number n of available complemental channels by dividing ($P_{low}$–P) by $P_{unit}$.

However, if P is $P_{low}$ or higher (P≧$P_{low}$) in the first comparator 724, this implies that there is no extra channel capacity for further providing complemental service. Then, the base station control processor 621 stops operations related with additional provision of complemental service.

Then, P is compared with $P_{high}$. A second comparator 730 compares P with $P_{high}$. If P is $P_{high}$ or smaller (P≦$P_{high}$), this implies that data is transmitted within the given total transmission power of the base station 620. Thus, the base station control processor 621 may maintain the currently provided complemental service. However, if P is higher than $P_{high}$ (P>$P_{high}$), this implies that the current total transmission power of the base station 620 exceeds the reference power. In this case, the base station control processor 621 operates to drop the current total transmission power of the base station 620 by stopping the currently provided complemental service. It is preferable to adjust the amount of complemental data to the extent that P is $P_{high}$ or smaller, without entirely stopping the complemental service. Therefore, if P>$P_{high}$, a complemental service checker 732 checks whether a complemental service is being provided. If no complemental service is being provided, the complemental service checker 732 operates no more. On the other hand, if a complemental service is being provided, a second calculator 734 subtracts $P_{high}$ from P, and a second determiner 736 reduces the complemental data to the range that P≦$P_{high}$.

For reduction of the complemental data, the second calculator 736 determines the number of complemental channels to be reduced by $$N = \left[\frac{P - P_{high}}{P_{unit}}\right] \quad (6)$$

where N indicates the number of complemental channels to be eliminated, and $P_{unit}$ indicates transmission power per channel. Thus, the second calculator 734 obtains a power value referred to for reducing the complemental service by (P–$P_{high}$), and the second calculator 736 determines N by dividing (P–$P_{high}$) by $P_{unit}$. That is, after the second calculator 736 compares N with the number $N_o$ of existing complemental channels, it stops the complemental service provided via N complemental channels if N≦$N_o$, and allows the complemental service via ($N_o$–N) complemental channels. If N>$N_o$, the complemental channel service is entirely stopped.

Figure 8:
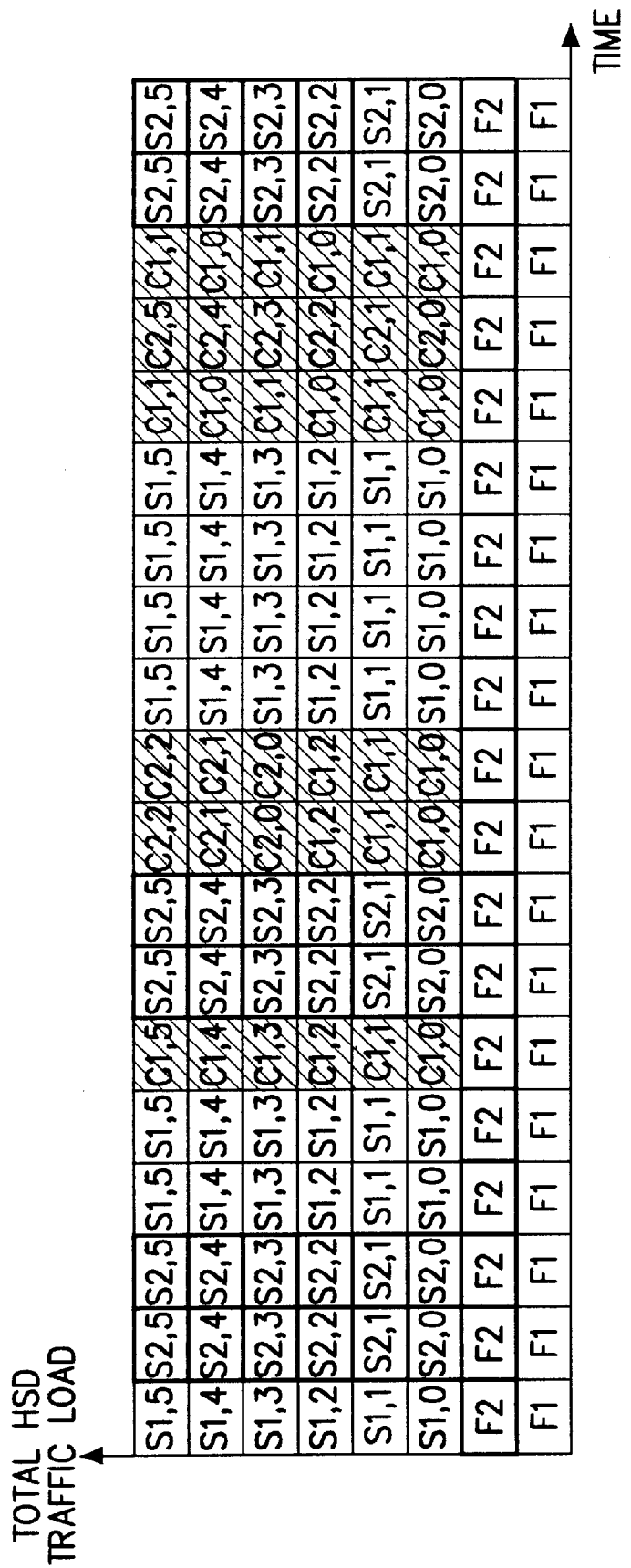
FIG. 8 illustrates an exemplary use of forward channels designated as complemental channels according to an embodiment of the present invention.

The effects of complemental service according to the embodiment of the present invention, that is, maintenance of the total transmission power of a base station to be constant are illustrated in FIG. 8, in an exemplary complemental service related with two data users.

FIG. 8 shows use of forward code channels in a high-speed data service for two users via supplemental channels. The horizontal axis represents time, and the vertical axis represents the number of code channels used, which eventually indicates forward CDMA channel load.

In FIG. 8, F indicates a fundamental channel, and a number attached to F indicates a user number. Thus, F1 indicates a fundamental channel for user 1. S indicates a supplemental channel, and first and second numbers attached to S indicate user number, and the number of a supplemental channel used, respectively. Thus, S2,3 indicates supplemental channel 3 for user 2.

Here, C in slash-marked portions indicates a complemental channel, and first and second numbers attached to C indicate user number and the number of a complemental channel used, respectively. Therefore, C1,5 indicates complemental channel 5 for user 1. Complemental channels C contribute to stable system operation and the increase of channel capacity, because complemental service is provided via the complemental channels assigned from idle channels, and filled with useful data.

Figure 9A:
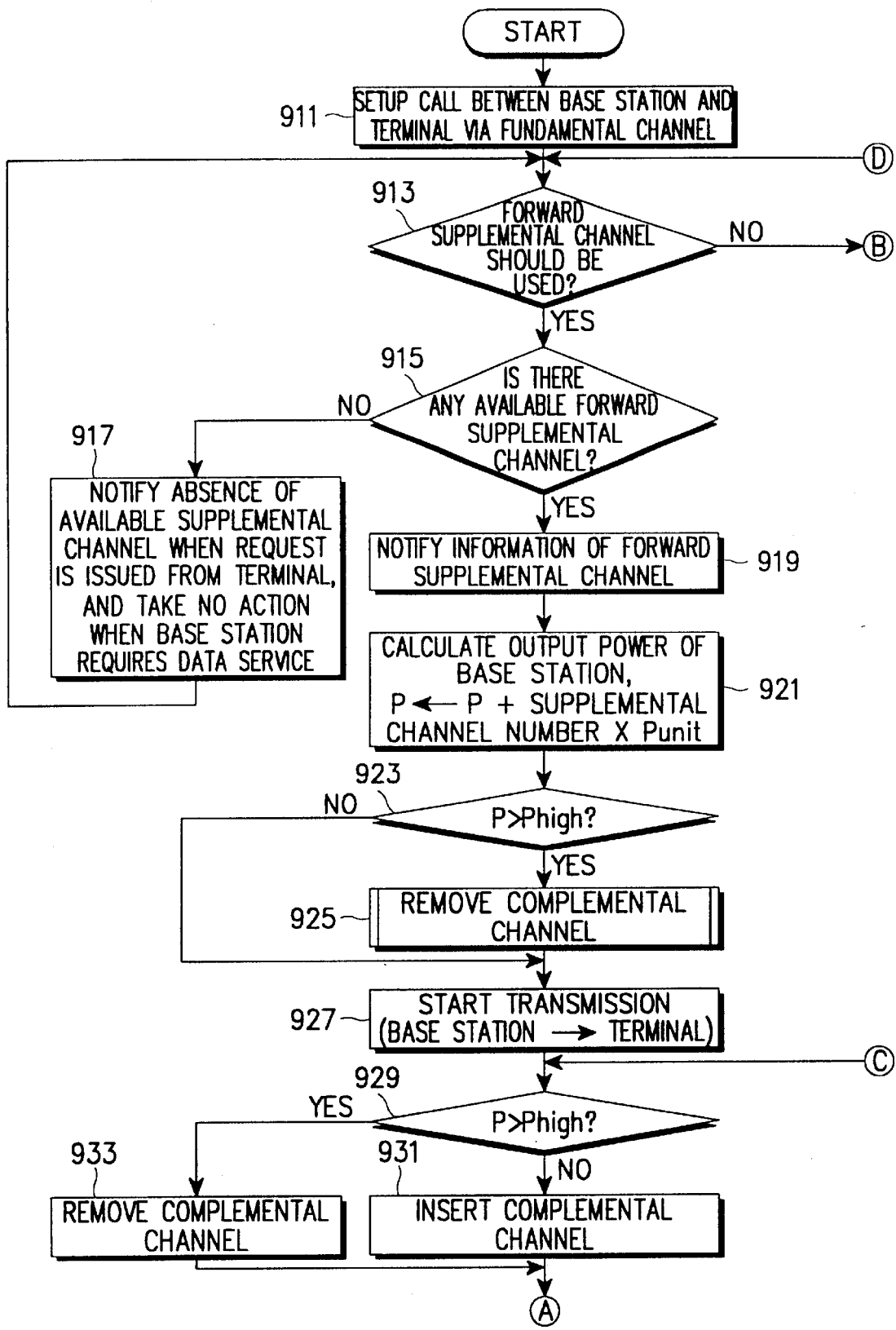
FIGS. 9a and 9b are a flowchart for providing and releasing complemental service through forward supplemental channels during a data service in a CDMA communications systems according to an embodiment of the present invention.
Figure 9B:
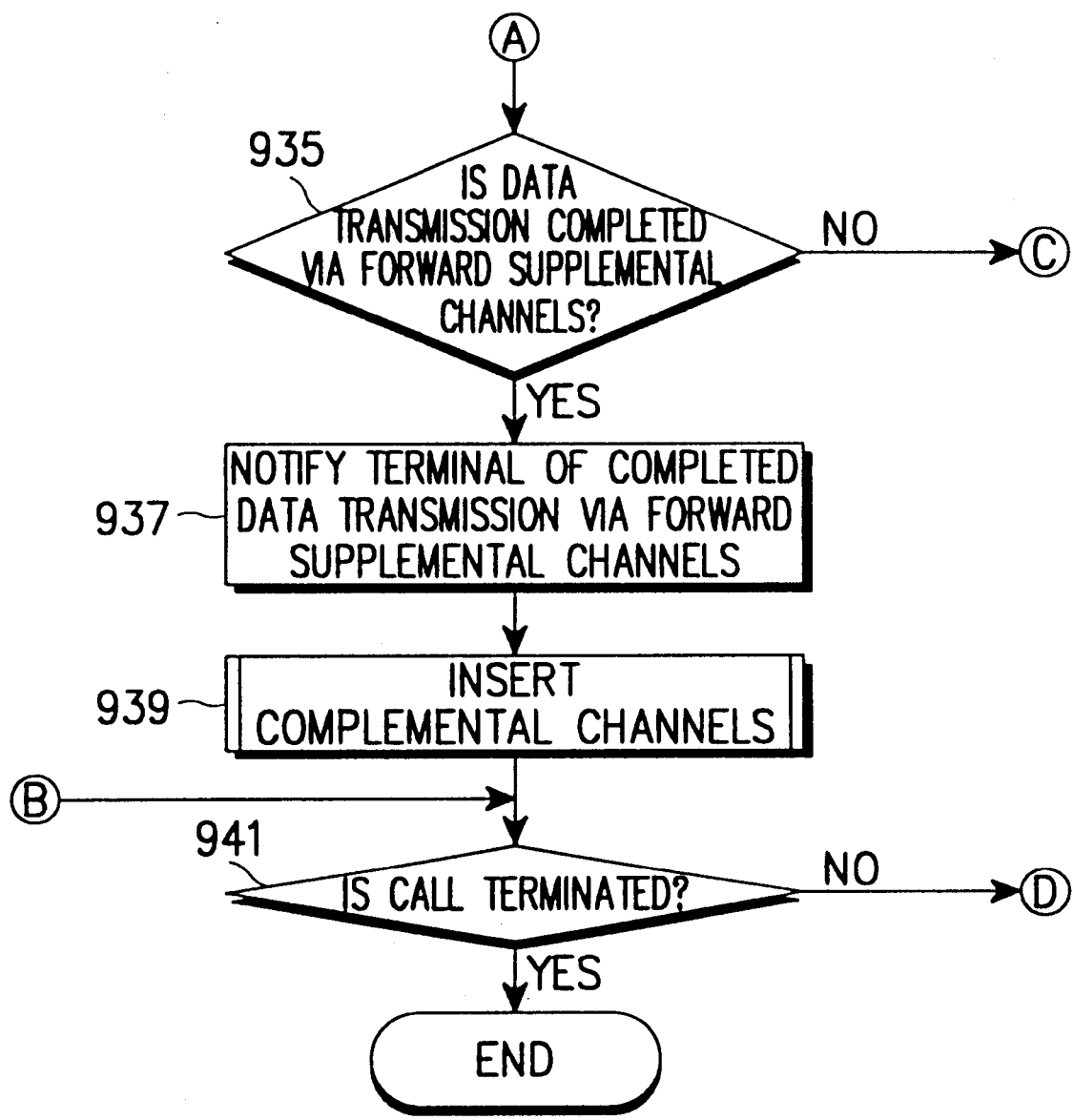

FIGS. 9a and 9b show a flowchart for providing and releasing complemental service through the complemental channels during a high-speed data service via forward supplemental channels. The complemental service of FIG. 9 is implemented by the base station control processor 621 (FIG. 6). Referring to FIGS. 9a and 9b, the base station processor 621 sets up a call between a base station and a terminal via fundamental channels (step 911). Then, the base station control processor 621 determines whether high-speed data service is to be provided via forward supplemental channels upon request of the terminal, or from the need of the base station (step 913). If the data service is to be provided as a result of the determination, it is then determined whether there are forward supplemental channels available for the data service (step 915). In the absence of available supplemental channels, the procedure goes to step 917. At step 917, when the request for data service is issued from the terminal, the base station control processor 621 notifies the terminal as to the absence of the available supplemental channels, and the procedure returns to step 913. On the other hand, when the base station requires the data service, the procedure reverts back to step 913 without any action being performed at step 917, where it is determined whether the forward supplemental channels are required.

When there are available supplemental channels determined in step 915, the base station control processor 621 notifies the terminal with information relating to the forward supplemental channels for data service via a fundamental channel (step 919). In step 921, the base station control processor 621 calculates the output power of the base station at the time when the data service is being provided via the newly assigned forward supplemental channels in order to determine whether the complemental service should be further provided or stopped, based on the following equation:

$$P_{(n+1)} = P_{(n)} + N_{sup} \times P_{unit} \quad (7)$$

where $P_{(n)}$ is the output power level of the base station shortly before the start of complemental service via new supplemental channels, $P_{unit}$ is a reference power level for a supplemental service to provide data service, $N_{sup}$ is the number of supplemental channels required for a new data service, and $P_{(n+1)}$ is the output power level of the base station after the data service is provided via the new supplemental channels. That is, the use of the new supplemental channels increases the output power level of the base station, which is considered in determining the number of complemental channels under a changed circumstance.

When the new output power level of the base station is estimated in step 921, the base station control processor 621 compares P with $P_{high}$ in step 923. If $P>P_{high}$, the complemental channel is removed at step 925, and the procedure goes to step 927. If $P \leq P_{high}$, the procedure jumps from step 923 to step 927. At step 927, the data service starts to be provided via the forward supplemental channels (i.e., the transmission of data starts through the forward supplemental channels).

The base station then periodically checks the output power level of the base station so that the complemental channels being used for complemental service are removed or new complemental channels are inserted. In step 929, the base station control processor 621 compares the output power level P of the base station with the highest reference power limit $P_{high}$. If $P>P_{high}$, the complemental channels are removed in step 933, and the procedure goes to step 935. If $P \leq P_{high}$, complemental channels are inserted in step 931, and the procedure goes to step 935.

Figure 10:
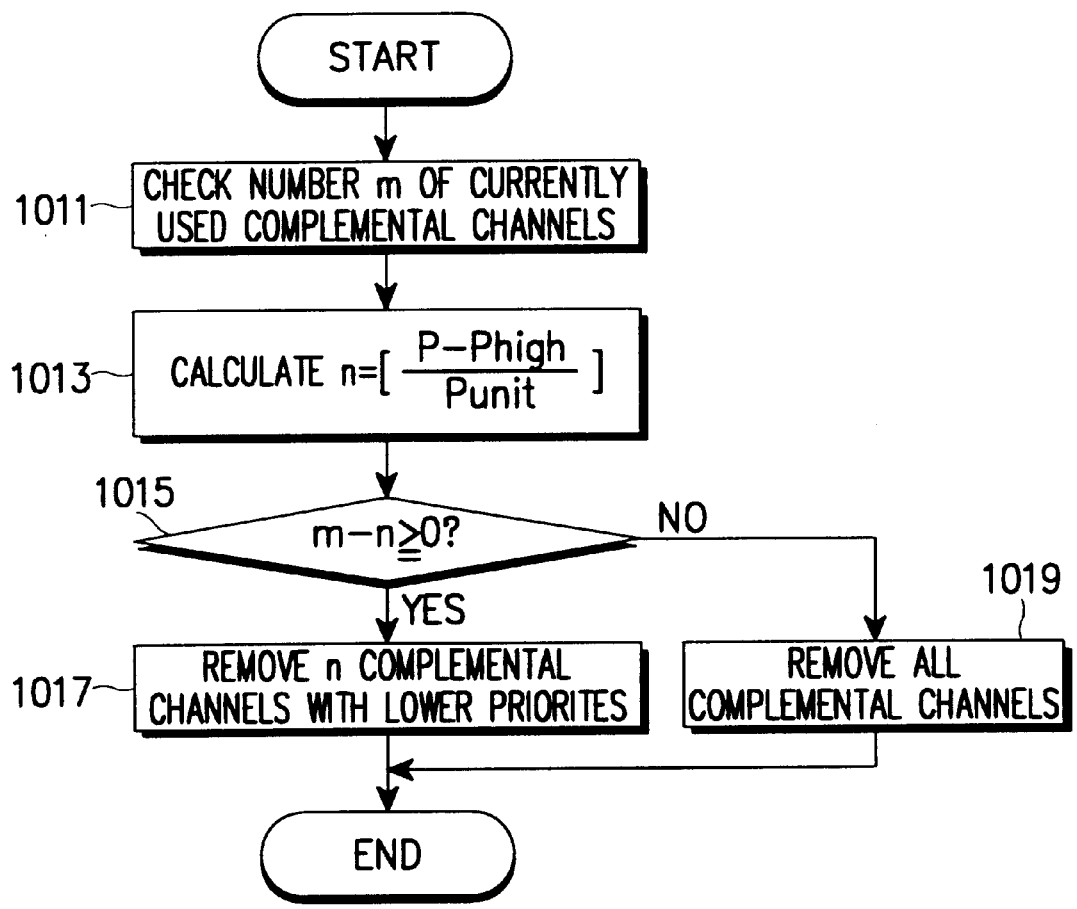
FIG. 10 is a flowchart for removing the complemental channels during the complemental service of FIG. 9.

FIG. 10 is an exemplary flowchart for removing the complemental channels described referring to step 933 of FIG. 9a. For removal of the complemental channels, the number m of complemental channels in use for the complemental service is determined in step 1011. In step 1013, P is compared with $P_{high}$ and the number n of channels having $P_{unit}$ as their reference power levels is calculated. In step 1015, m is compared with n. If $m \geq n$ (i.e., if the number of channels to be terminated is smaller than the number of complemental channels in use for the current service, n complemental channels are terminated in accordance with the priority of the current complemental service (step 1017). Then the procedure is completed. On the contrary, if m<n, all the complemental channels in use for the complemental service are terminated or removed (step 1019), and the complemental channel removal procedure is over.

Figure 11:
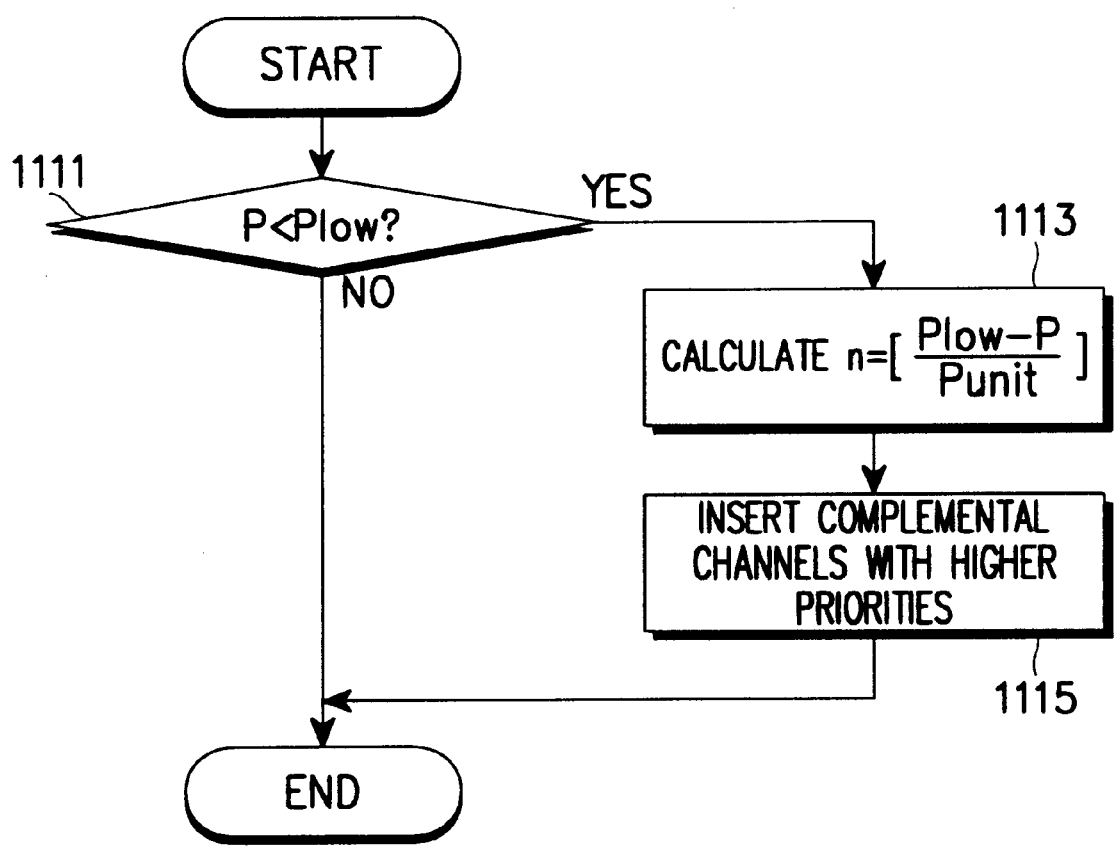
FIG. 11 is a flowchart for re-inserting the complemental channels following the removal of the complemental channels of FIG. 9.

FIG. 11 is an exemplary flowchart for inserting the complemental channels described with reference to step 931 of FIG. 9a. For inserting the complemental channels, if the current output power level of the base station $P \geq$ the lowest reference power limit $P_{low}$, no complemental channels are added. On the contrary, if $P<P_{low}$, the number n of complemental channels at P, $P_{low}$, and $P_{high}$ is calculated in step 1113. Then, in step 1115, n complemental channels are inserted according to the priorities of complemental services, and the procedure is over.

Following the removal or insertion of the complemental channels as shown in FIGS. 10 and 11, the base station control processor 621 determines whether data is completely transmitted via the forward supplemental channels (step 935). If the data transmission is completed, the procedure goes to step 937. Otherwise, an operation for changing the complemental channels is performed according to periodical variation of the base station (step 939). Then, the base station control processor 621 notifies the terminal of the completed data transmission via the forward supplemental channels (step 937), and inserts complemental channels to compensate for variation in the output power level of the base station caused by the termination of the complemental channel (step 929). In step 941, it is determined whether the call should be terminated. If the call should be terminated, the entire procedure is over. Otherwise, it is determined whether forward supplemental channels are to be used (step 913).

As described above, complemental services are provided by introducing complemental channels into a CDMA mobile communications system. As a result, wasted resources become useful, and system stability and channel capacity increase.

What is claimed is:

1. A method for providing complemental service in a CDMA communications system, comprising the steps of:

detecting a total transmission power of currently used supplemental channels;

comparing the total transmission power with a predetermined reference value; and determining supplemental channels available for the complemental service and inserting the supplemental channels as complemental channels when the total transmission power is smaller than the reference value.

2. The method as claimed in claim 1, further comprising the step of obtaining the total transmission power by multiplying the number of the currently used supplemental channels by a unit power thereof.

3. The method as claimed in claim 1, wherein the step of inserting further comprises the steps of:

calculating the number of the complemental channels available for the complemental service by subtracting the total transmission power from the reference value and dividing the resulting value by a unit power; and determining supplemental channels with higher priorities according to the number of the complemental channels and inserting the supplemental channels as complemental channels.

4. The method as claimed in claim 1, wherein the reference value is a lowest reference limit of the total transmission power of the supplemental channels which enables the complemental service.

5. The method as claimed in claim 1, further comprising the step of removing the complemental channels when the total transmission power is larger than the reference value.

6. A complemental service providing device in a CDMA communication system comprising:

a power measurer for measuring the total transmission power of currently used supplemental channels;

a comparator for comparing the total transmission power with a predetermined reference value; and a complemental channel inserter for determining supplemental channels available for the complemental service and inserting the supplemental channels as complemental channels when the total transmission power is smaller than the reference value.

7. The complemental service providing device as claimed in claim 6, wherein the power measurer comprises a plurality of squaring devices for receiving respective powers of the currently used supplemental channels, and an adder for adding the output powers of the squaring devices and detecting the total transmission power.

8. The complemental service providing device as claimed in claim 6, wherein the complemental channel inserter comprises:

a complemental power calculator for calculating the number of complemental channels available for the complemental service by subtracting the total transmission power from the reference value and dividing the resulting value by the unit power; and a complemental channel determiner for determining supplemental channels with higher priorities according to the number of the complemental channels and inserting the supplemental channels as complemental channels.

9. The complemental service providing device as claimed in claim 8, wherein the reference value is a lowest reference limit of the total transmission power of the supplemental channels which enables the complemental service.

10. The complemental service providing device as claimed in claim 6, further comprising a complemental channel remover for removing the complemental channels when the total transmission power is larger than the reference value.

11. A method for providing complemental service in a CDMA communication system comprising the steps of:
   detecting a total transmission power of currently used supplemental channels;
   comparing the total transmission power with a predetermined first reference value, determining supplemental channels available for the complemental service when the total transmission power is smaller than a first reference value, and inserting the supplemental channels as complemental channels; and
   comparing the total transmission power with a predetermined second reference value and removing the complemental channels when the total transmission power is larger than the second reference value.

12. The complemental service providing method as claimed in claim 11, further comprising the step of obtaining the total transmission power by multiplying the number of currently used supplemental channels by a unit power thereof.

13. The complemental service providing method as claimed in claim 11, wherein the step of inserting the supplemental channels as complemental channels further comprises the steps of:
   calculating the number of complemental channels available for the complemental service by subtracting the total transmission power from the reference value and dividing the resulting value by the unit power; and
   determining supplemental channels with higher priorities according to the number of complemental channels and inserting the supplemental channels as complemental channels.

14. The complemental service providing method as claimed in claim 13, wherein the first reference value is a lowest reference limit of the total transmission power of the supplemental channels which enables the complemental service.

15. The complemental service providing method as claimed in claim 13, wherein the step of removing complemental channels further comprises the steps of:
   determining the number of current complemental channels;
   determining the number of complemental channels to be removed by subtracting the second reference value from the total transmission power and dividing the resulting value by the unit power; and
   removing complemental channels with lower priorities according to the number of complemental channels to be removed.

16. The complemental service providing method as claimed in claim 15, wherein the second reference value is a highest reference limit of the total transmission power of the supplemental channels at which complemental channels should be removed.

17. The complemental service providing method as claimed in claim 11, wherein the step of removing complemental channels further comprises the steps of:
   determining the number of current complemental channels;
   determining the number of complemental channels to be removed by subtracting the second reference value from the total transmission power and dividing the resulting value by a unit power; and
   removing complemental channels with lower priorities according to the number of complemental channels to be removed.

18. The complemental service providing method as claimed in claim 17, wherein the second reference value is a highest reference limit of the total transmission power of the supplemental channels at which complemental channels should be removed.

19. The complemental service providing method as claimed in claim 17, wherein the step of inserting a complemental channel further comprises the steps of:
   calculating the number of complemental channels available for the complemental service by subtracting the total transmission power from the first reference value and dividing the resulting value by the unit power; and
   determining supplemental channels with higher priorities according to the number of complemental channels and inserting the supplemental channels as complemental channels.

20. The complemental service providing method as claimed in claim 19, wherein the first reference value is a lowest reference limit of the total transmission power of the supplemental channels which enables the complemental service.

21. A complemental service providing device in a CDMA communication system comprising:
   a power measurer for measuring the total transmission power of currently used supplemental channels;
   a first comparator for comparing the total transmission power with a predetermined first reference value;
   a complemental channel inserter for determining supplemental channels available for the complemental service and inserting the supplemental channels as complemental channels when the total transmission power is smaller than the first reference value;
   a second comparator for comparing the total transmission power with a predetermined second reference value; and
   a complemental channel remover for removing the complemental channels when the total transmission power is larger than the second reference value.

22. The complemental service providing device as claimed in claim 21, wherein the power measurer comprises a plurality of squaring devices for receiving the respective powers of the currently used supplemental channels, and an adder for adding the output powers of the squaring devices and detecting the total transmission power.

23. The complemental service providing device as claimed in claim 21, wherein the complemental channel inserter comprises:
   a first calculator for calculating the number of complemental channels available for the complemental service by subtracting the total transmission power from the first reference value and dividing the resulting value by the unit power; and
   a first determiner for determining supplemental channels with higher priorities according to the number of complemental channels and inserting the supplemental channels as complemental channels.

24. The complemental service providing device as claimed in claim 23, wherein the first reference value is the lowest reference limit of the total transmission power of the supplemental channels, which enables the complemental service.

25. The complemental service providing device as claimed in claim 23, wherein the complemental channel remover comprises:
   a complemental service checker for determining the number of current complemental channels;
   a second calculator for calculating the number of complemental channels to be removed by subtracting the second reference value from the total transmission power and dividing the resulting value by a unit power; and
   a second determiner for removing complemental channels with lower priorities according to the number of complemental channels to be removed.

26. The complemental service providing device as claimed in claim 25, wherein the second reference value is a highest reference limit of the total transmission power of the supplemental channels at which complemental channels should be removed.

27. The complemental service providing device as claimed in claim 21, wherein the complemental channel remover comprises:
   a complemental service checker for determining the number of current complemental channels;
   a second calculator for calculating the number of complemental channels to be removed by subtracting the second reference value from the total transmission power and dividing the resulting value by a unit power; and
   a second determiner for removing complemental channels with lower priorities according to the number of complemental channels to be removed.

28. The complemental service providing device as claimed in claim 27, wherein the second reference value is a highest reference limit of the total transmission power of the supplemental channels at which complemental channels should be removed.

29. The complemental service providing device as claimed in claim 27, wherein the complemental inserter comprises:
   a first calculator for calculating the number of complemental channels available for the complemental service by subtracting the total transmission power from the first reference value and dividing the results by the unit power; and
   a first determiner for determining supplemental channels with higher priorities according to the number of the complemental channels and inserting the supplemental channels as complemental channels.

30. The complemental service providing device as claimed in claim 29, wherein the first reference value is a lowest reference limit of the total transmission power of the supplemental channels, which enables the complemental service.

* * * * *